(12) United States Patent
Raviv et al.

(10) Patent No.: US 6,377,250 B1
(45) Date of Patent: Apr. 23, 2002

(54) DEVICE FOR USE WITH RASTER DISPLAY

(76) Inventors: Roni Raviv, 13 Dalia Street, Nes Ziona 74061 (IL); Omri Rothschild, 32 Avner Street, Tel Aviv 69937 (IL)

( * ) Notice: Subject to any disclaimer, the term of this patent is extended or adjusted under 35 U.S.C. 154(b) by 0 days.

(21) Appl. No.: 09/234,139

(22) Filed: Jan. 19, 1999

(51) Int. Cl.[7] .................................................. G09G 5/00
(52) U.S. Cl. ........................ 345/179; 345/158; 345/180
(58) Field of Search .................................. 345/178, 180, 345/173, 175, 181, 158, 156; 178/18.01–18.11, 19.01–19.07

(56) References Cited

U.S. PATENT DOCUMENTS

| | | | |
|---|---|---|---|
| 3,505,561 A | 4/1970 | Ward et al. ..................... 315/18 |
| 3,506,875 A | 4/1970 | Watanabe et al. .............. 315/12 |
| 3,543,240 A | 11/1970 | Miller et al. ............. 340/172.5 |
| 3,551,896 A | 12/1970 | Baskin et al. ............ 340/172.5 |
| 3,594,608 A | 7/1971 | Mutton ......................... 315/24 |
| 3,651,509 A | 3/1972 | Ngo ........................... 340/324 |
| 3,659,281 A | 4/1972 | Mori ...................... 340/324 A |
| 3,758,717 A | 9/1973 | Granzotti ..................... 178/6.8 |
| 3,944,988 A | 3/1976 | Mayer ..................... 340/172.5 |
| 3,997,891 A | 12/1976 | Iwamura et al. ...... 340/324 AD |
| 4,017,680 A | 4/1977 | Anderson et al. ........... 358/242 |
| 4,053,765 A | 10/1977 | Kuffer ........................ 250/227 |
| 4,109,146 A | 8/1978 | Hillman ...................... 250/227 |
| 4,129,858 A | 12/1978 | Hara .................... 340/324 AD |
| 4,146,880 A | 3/1979 | Arizabalaga ................ 340/707 |
| 4,190,831 A | 2/1980 | Stahle et al. ................ 340/707 |
| 4,263,592 A | 4/1981 | Takahashi et al. .......... 340/707 |
| 4,277,783 A | 7/1981 | Sampieri et al. ............ 340/708 |
| 4,367,465 A | 1/1983 | Mati et al. .................. 340/707 |
| 4,377,810 A | 3/1983 | Wolff ......................... 340/707 |
| 4,454,417 A | 6/1984 | May ........................... 250/216 |
| 4,565,947 A | 1/1986 | Minn ........................... 313/467 |
| 4,591,841 A | * 5/1986 | Gunderson et al. ........... 178/18 |
| 4,602,907 A | 7/1986 | Foster ......................... 434/337 |
| 4,620,107 A | 10/1986 | Frame ......................... 250/566 |
| 4,642,459 A | 2/1987 | Caswell et al. .............. 250/227 |
| 4,675,665 A | 6/1987 | Halliwell .................... 340/707 |
| 4,677,428 A | 6/1987 | Bartholow .................. 340/708 |
| 4,697,175 A | 9/1987 | Macdonald ................. 340/707 |
| 4,771,276 A | 9/1988 | Parks ......................... 340/712 |
| 4,789,836 A | 12/1988 | May ........................... 328/117 |
| 4,802,722 A | 2/1989 | Persson ..................... 350/96.1 |
| 4,812,828 A | 3/1989 | Nishi et al. ................. 340/706 |
| 4,923,401 A | 5/1990 | Marshall et al. .............. 434/22 |
| 5,134,389 A | 7/1992 | Furuta et al. ............... 340/707 |
| 5,138,304 A | 8/1992 | Bronson ..................... 340/707 |
| 5,151,688 A | 9/1992 | Tanaka et al. .............. 340/707 |
| 5,179,368 A | 1/1993 | Lippincott .................. 340/707 |
| 5,187,467 A | 2/1993 | Myers ........................ 340/707 |
| 5,600,348 A | 2/1997 | Bartholow et al. .......... 345/180 |
| 5,684,505 A | * 11/1997 | Takita et al. ................ 345/104 |
| 5,691,749 A | 11/1997 | Sugiyama ................... 345/181 |
| 5,877,752 A | 3/1999 | Puthuff et al. .............. 345/180 |
| 6,124,848 A | * 9/2000 | Ballare et al. |

* cited by examiner

*Primary Examiner*—Dennis-Doon Chow
(74) *Attorney, Agent, or Firm*—Ladas & Parry

(57) ABSTRACT

A device for use with a raster display having associated therewith electromagnetic noise which includes signals related to at least one raster synchronization signal. The device includes: an electromagnetic radiation pick up device operative to receive the electromagnetic noise in a wireless manner, a filter receiving an output from the electromagnetic radiation pick up device for producing a reconstructed raster synchronization signal from the electromagnetic noise; and a correlator correlating an information signal with the reconstructed raster synchronization signal. The device may be a light pen, and one version detects scan lines within a cone extending from the tip thereof. The number of scan lines detected within the cone can be used to estimate the distance of the light pen from a computer screen. A light pen method is also provided.

19 Claims, 18 Drawing Sheets

$$Y_{position} = \frac{t_V}{t_{Vscan}} \times full\ image\ height$$

$$X_{position} = \frac{t_H}{t_{Hscan}} \times full\ image\ width$$

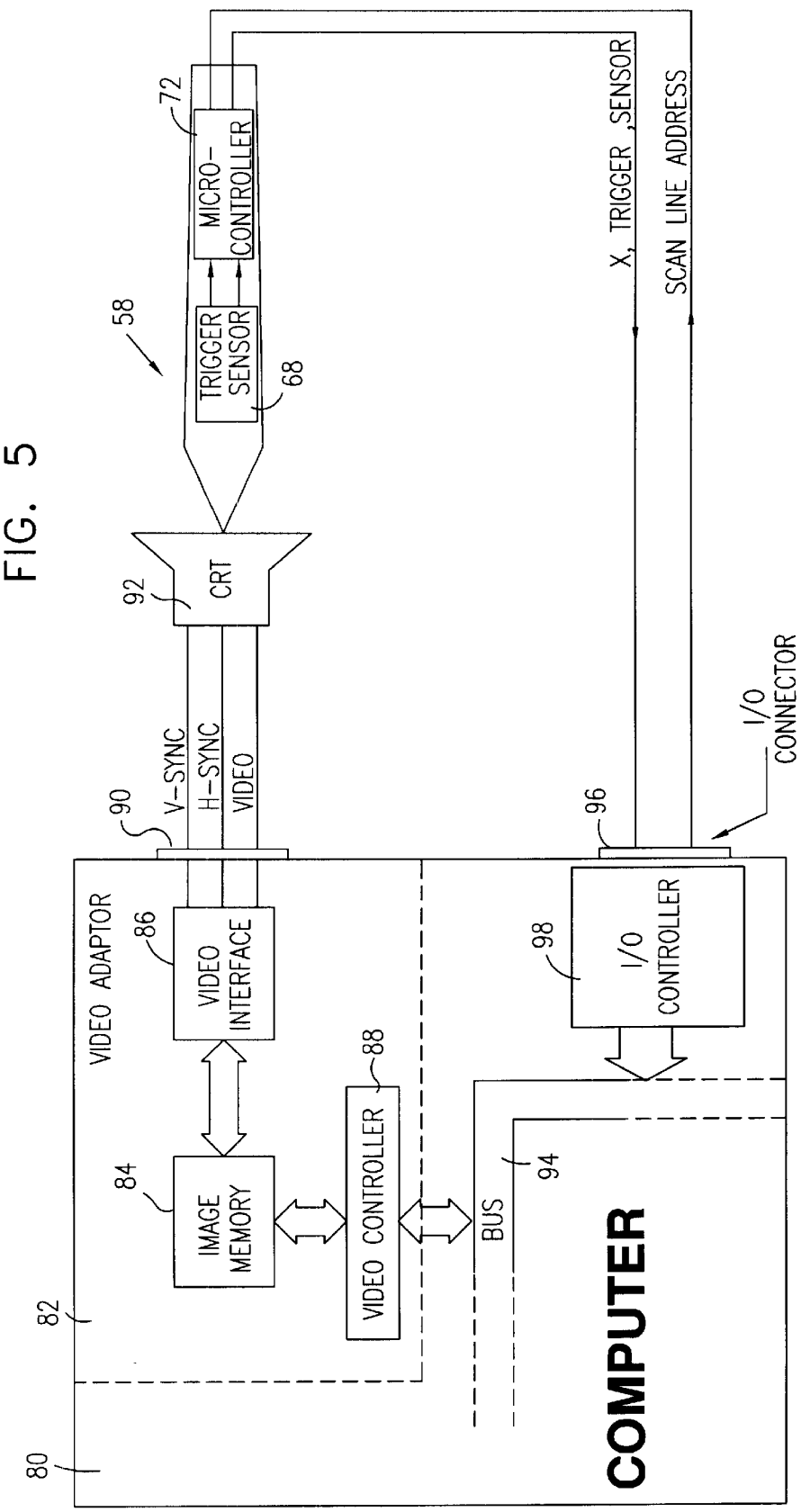

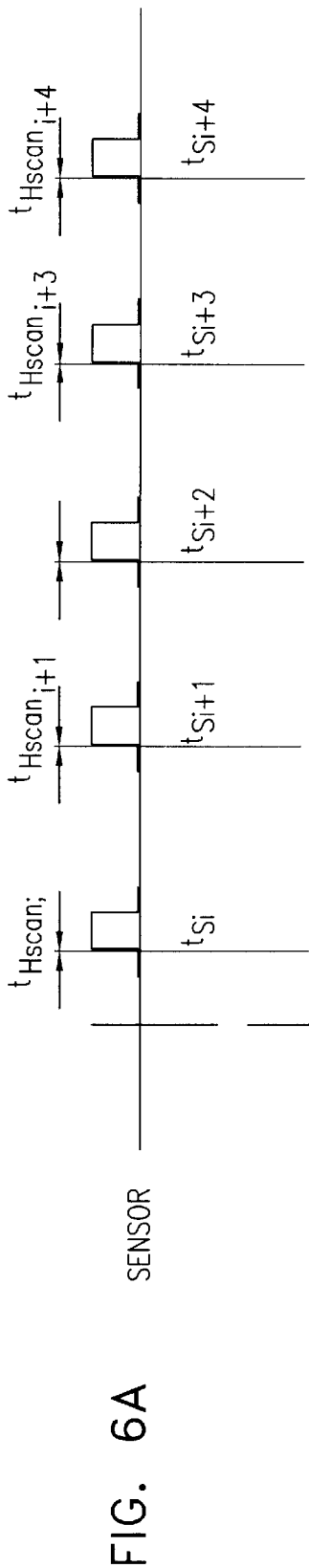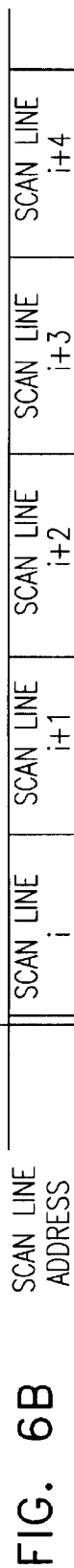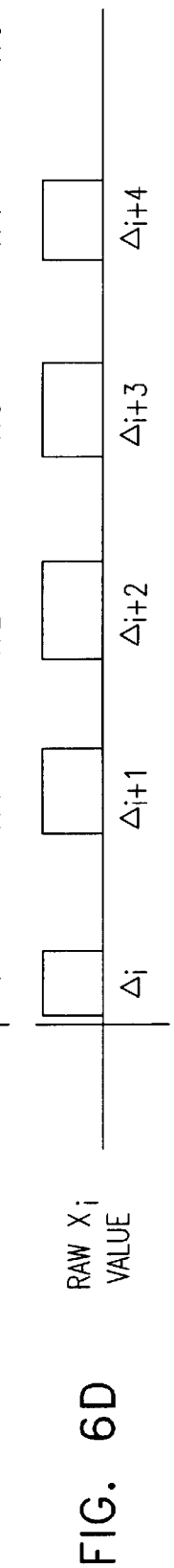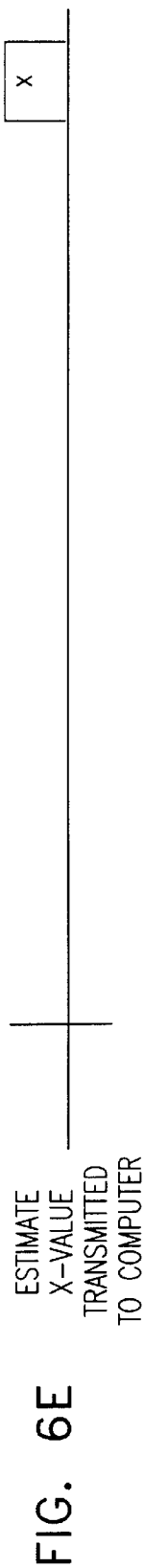

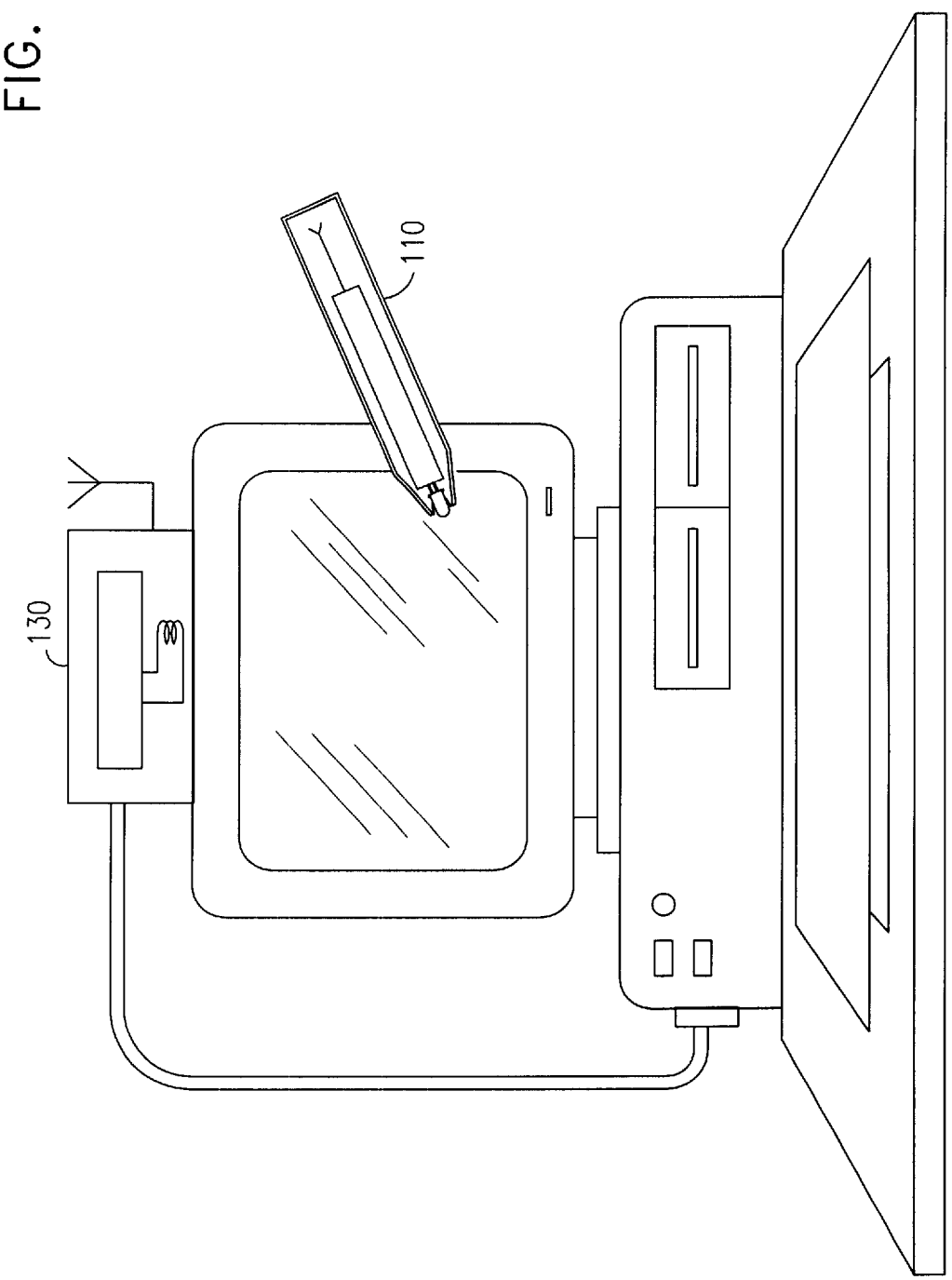

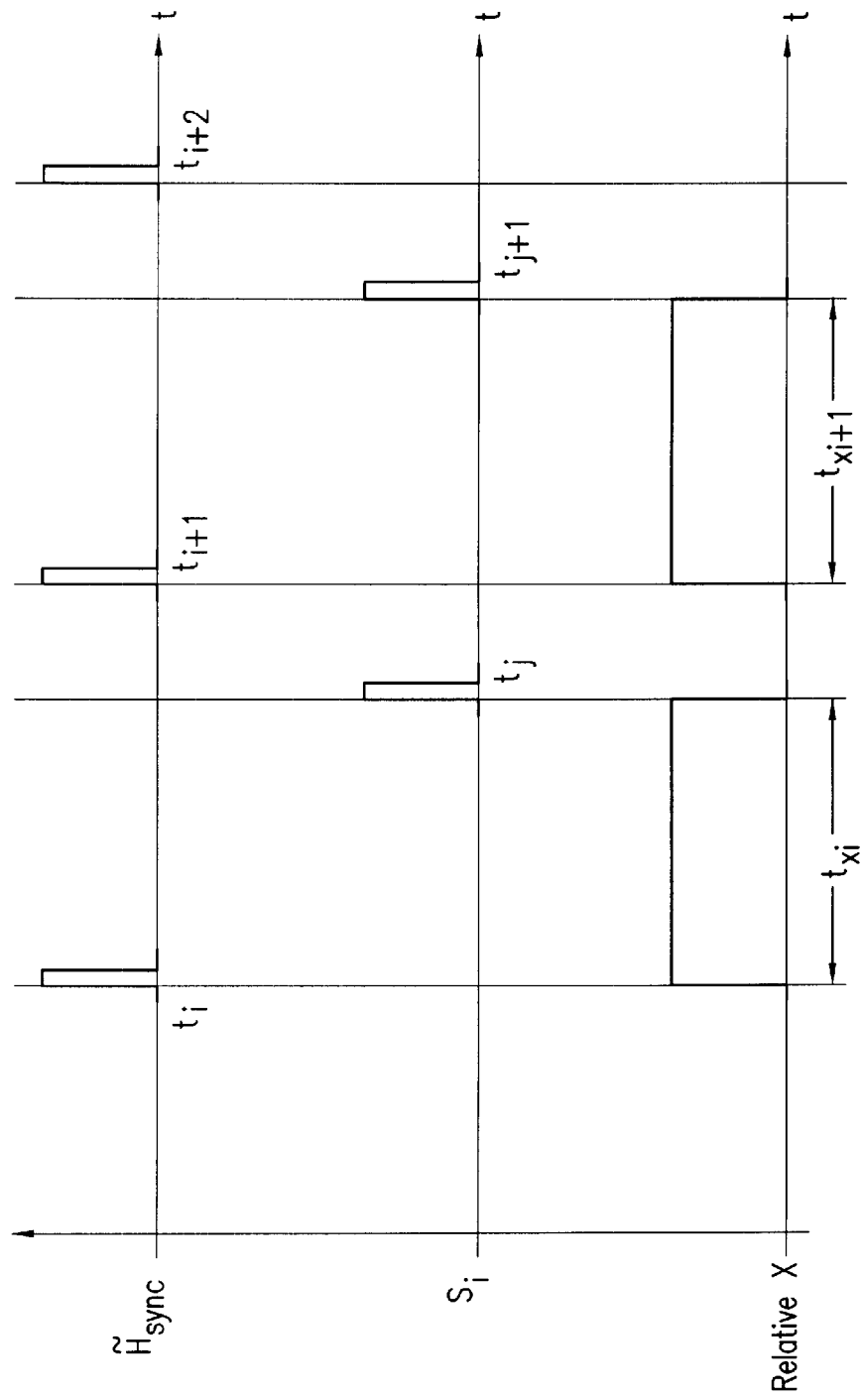

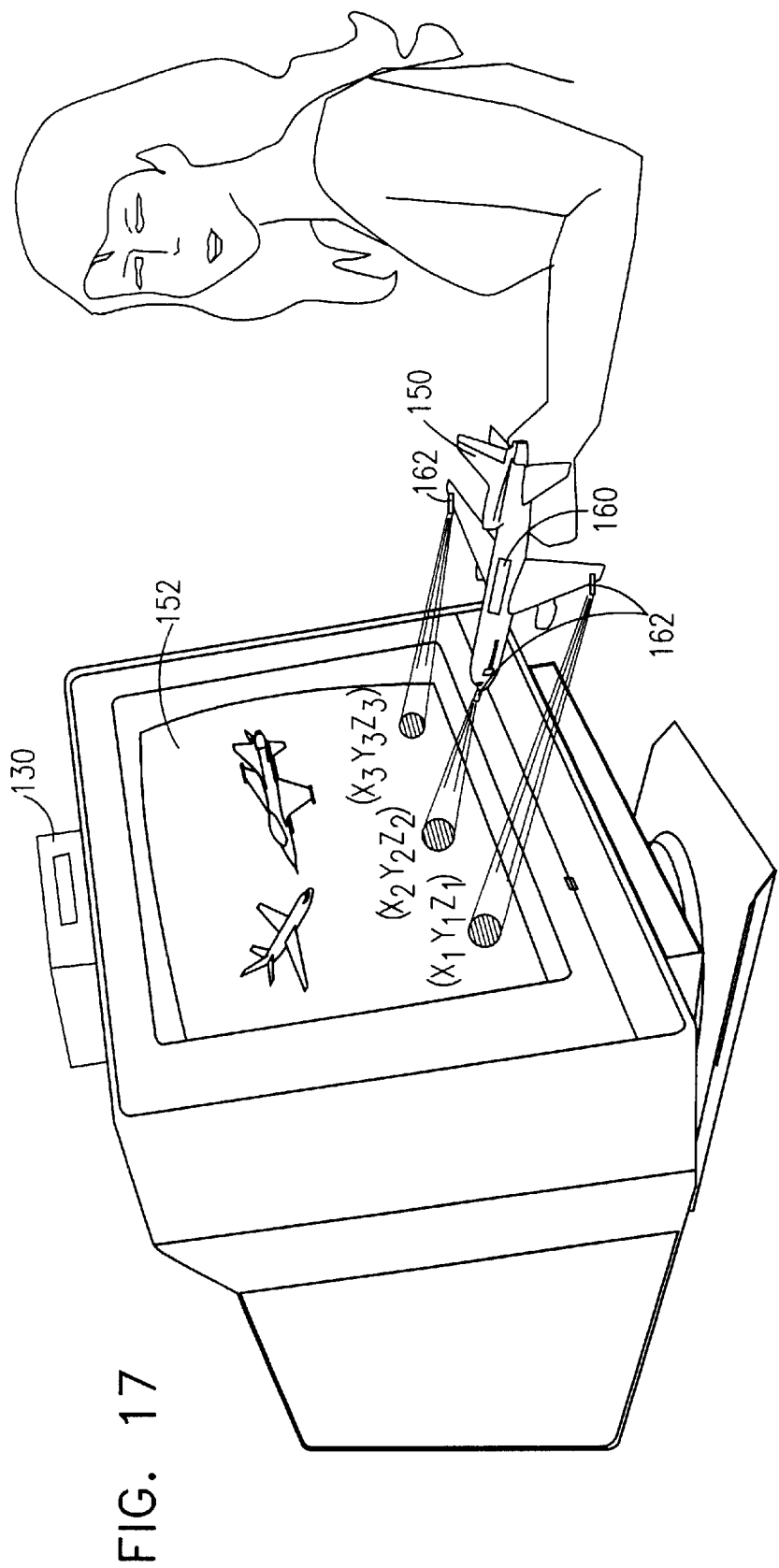

DEVICE FOR USE WITH RASTER DISPLAY

FIELD OF THE INVENTION

The present invention relates to a device for use with a display and more particularly, but not exclusively, to light pen systems which interact with a computer display.

BACKGROUND OF THE INVENTION

A great variety of interactive computer systems and computer input devices useful therewith are known in the art. Various types of light pens are described in the following U.S. Patents, which are believed to represent the current state of the art:

U.S. Pat. Nos. 5,691,749; 5,600,348; 5,187,467; 5,179,368; 5,151,688; 5,138,304; 5,134,389; 4,923,401; 4,812,828; 4,802,722; 4,789,836; 4,771,276; 4,697,175; 4,677,428; 4,675,665; 4,642,459; 4,620,107; 4,602,907; 4,565,947; 4,454,417; 4,377,810; 4,367,465; 4,277,783; 4,263,592; 4,190,831; 4,146,880; 4,129,858; 4,109,146; 4,053,765; 4.017,680; 3,997,891; 3,944,988; 3,758,717; 3,659,281; 3,651,509; 3,594,608; 3,551,896; 3,543,240; 3,506,875; 3,505,561.

SUMMARY OF THE INVENTION

The present invention seeks to provide a computer input device which has various advantages over the prior art.

There is thus provided in accordance with a preferred embodiment of the present invention a device for use with a raster display having associated therewith electromagnetic noise which includes signals related to at least one raster synchronization signal, the device including:

an electromagnetic radiation pick up device operative to receive the electromagnetic noise in a wireless manner;

a filter receiving an output from the electromagnetic radiation pick up derive for producing a reconstructed horizontal raster synchronization signal from the electromagnetic noise; and a correlator correlating an information signal with the horizontal raster synchronization signal received via the filter and the pick up device and with an estimated vertical synchronization signal.

The electromagnetic radiation pick up device is preferably operative to pick up electronic noise generated at the raster display or at an input thereto. It may, for example, be an inductive coil.

The electromagnetic radiation pick up device may alternatively be operative to pick up electronic noise generated at a display signal generator generating an input signal to the raster display. The device may also comprise an information signal generator operative to generate the information signal. The information signal generator may comprise a light receiver which receives light from a region on the raster display and produces an information signal responsive thereto.

According to a second aspect of the invention there is provided a device for use with a display having associated therewith electromagnetic noise which includes signals related to at least one synchronization signal, the device including:

an electromagnetic radiation pick up device operative to receive the electromagnetic noise in a wireless manner;

a filter receiving an output from the electromagnetic radiation pick up device for producing a reconstructed horizontal synchronization signal from the electromagnetic noise; and a correlator correlating an information signal with the horizontal synchronization signal received via the filter and the pick up device and with an estimated vertical synchronization signal.

The light receiver may produce an information signal indicative of the position thereof relative to the display in three dimensions.

In accordance with a second aspect of the present invention there is provided a device for use with a display having associated therewith electromagnetic noise which includes signals related to at least one synchronization signal, said device including:

an electromagnetic radiation pick up device operative to receive said electromagnetic noise in a wireless manner;

a filter receiving an output from said electromagnetic radiation pick up device for producing a reconstructed horizontal synchronization signal from said electromagnetic noise; and a correlator correlating an information signal with said at least one reconstructed synchronization signal.

In an embodiment, the electromagnetic radiation pick up device is operative to pick up electronic noise generated at the display.

Alternatively, the electromagnetic radiation pick up device is operative to pick up electromagnetic noise generated by an input to the display.

In a preferred embodiment, the electromagnetic radiation pick up device is operative to pick up electromagnetic noise generated at a display signal generator generating an input signal to the display.

Preferably, an information signal generator is operative to generate the information signal.

The information signal generator comprises a light receiver which receives light from a region on the display and produces an information signal responsive thereto.

In an embodiment, the light receiver produces an information signal indicative of the position thereof relative to a display in three dimensions.

The information signal generator may comprise two or more light receivers, each of which receives light from a different region on the display, and may produce and information signal responsive thereto, the information signal being employed by the correlator for providing information regarding the orientations of two light receivers to said display.

Alternatively, the information signal generator comprises three or more three light receivers, each of which receives light from a different region on the display, and produces an information signal responsive thereto, the information signal being employed by the correlator for providing information regarding the orientations of the light receivers relative to the display.

BRIEF DESCRIPTION OF THE DRAWINGS

The present invention will be more fully understood and appreciated from the following detailed description, taken in conjunction with the drawings in which:

FIG. 5 is a simplified illustration of an interactive computer system constructed and operative in accordance with the present invention and employing the light pen assembly of the present invention;

FIGS. 6A, 6B, 6C, 6D and 6E are timing diagrams illustrating the operation of the interactive computer system of FIG. 5;

FIG. 13 shows a device according to the embodiment of FIG. 9 in use with a PC;

FIG. 15 is a waveform timing diagram illustrating the operation of the embodiment of FIG. 9;

FIG. 17 is a simplified illustration of an embodiment of the present invention particularly useful as part of an interactive toy.

DESCRIPTION OF THE PREFERRED EMBODIMENTS

Figure 1:
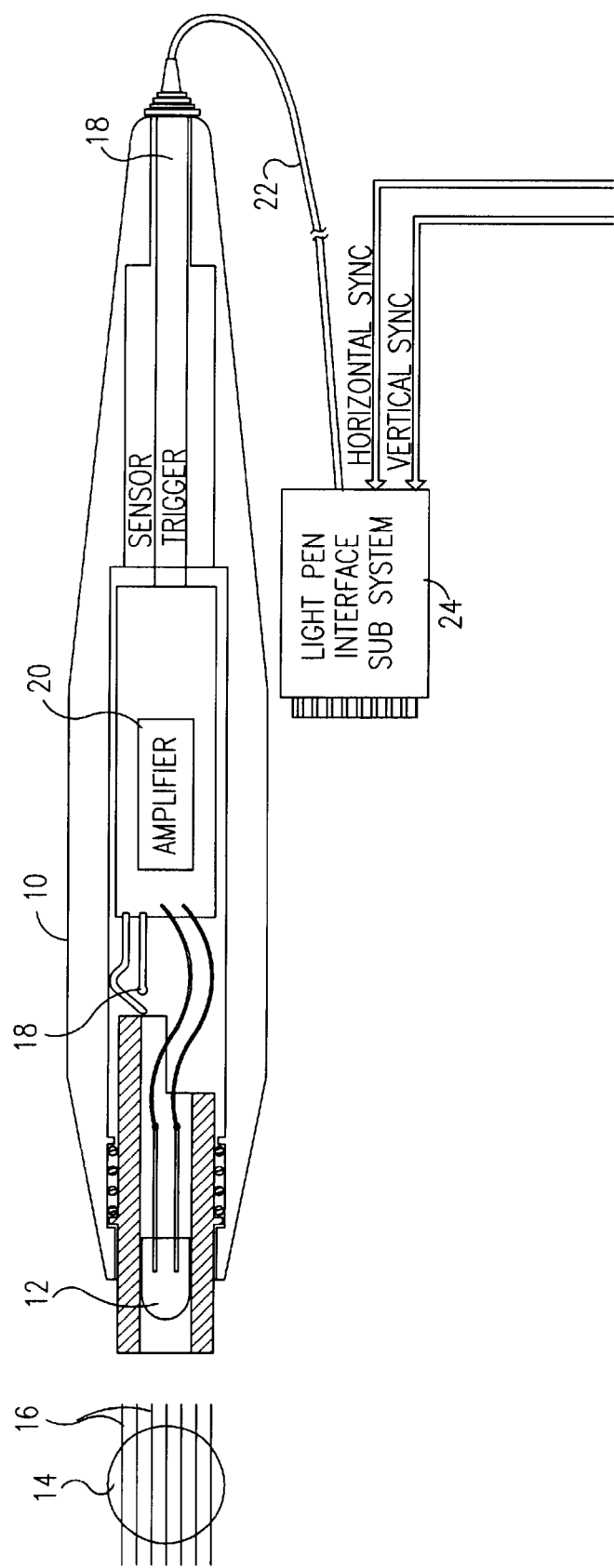
FIG. 1 is a simplified illustration of a typical prior art light pen assembly.

Reference is now made to FIG. 1, which is a simplified illustration of a typical prior art light pen assembly. The prior art light pen assembly of FIG. 1 comprises a hand-held housing 10 which is disposed a light sensor 12, such as a photodiode or phototransistor, which views an area 14 on a CRT screen and typically sees a plurality of scan lines 16 which cross the area. Mounted in housing 10 is a trigger switch 18, such as a pressure-sensitive switch which senses when the pen is pressed against a CRT screen.

The output of sensor 12 is supplied to an amplifier 20 which provides an amplified output signal. The amplified output signal is supplied together with a trigger output signal from trigger switch 18 via a cable 22 to a light pen interface sub-system 24, which is typically embodied as a special purpose interface card plugged into an expansion slot of a conventional computer (not shown). Light pen interface subsystem 24 receives horizontal and vertical sync signals which are tapped from the video connection between the computer and the CRT display (both not shown).

Figure 2:
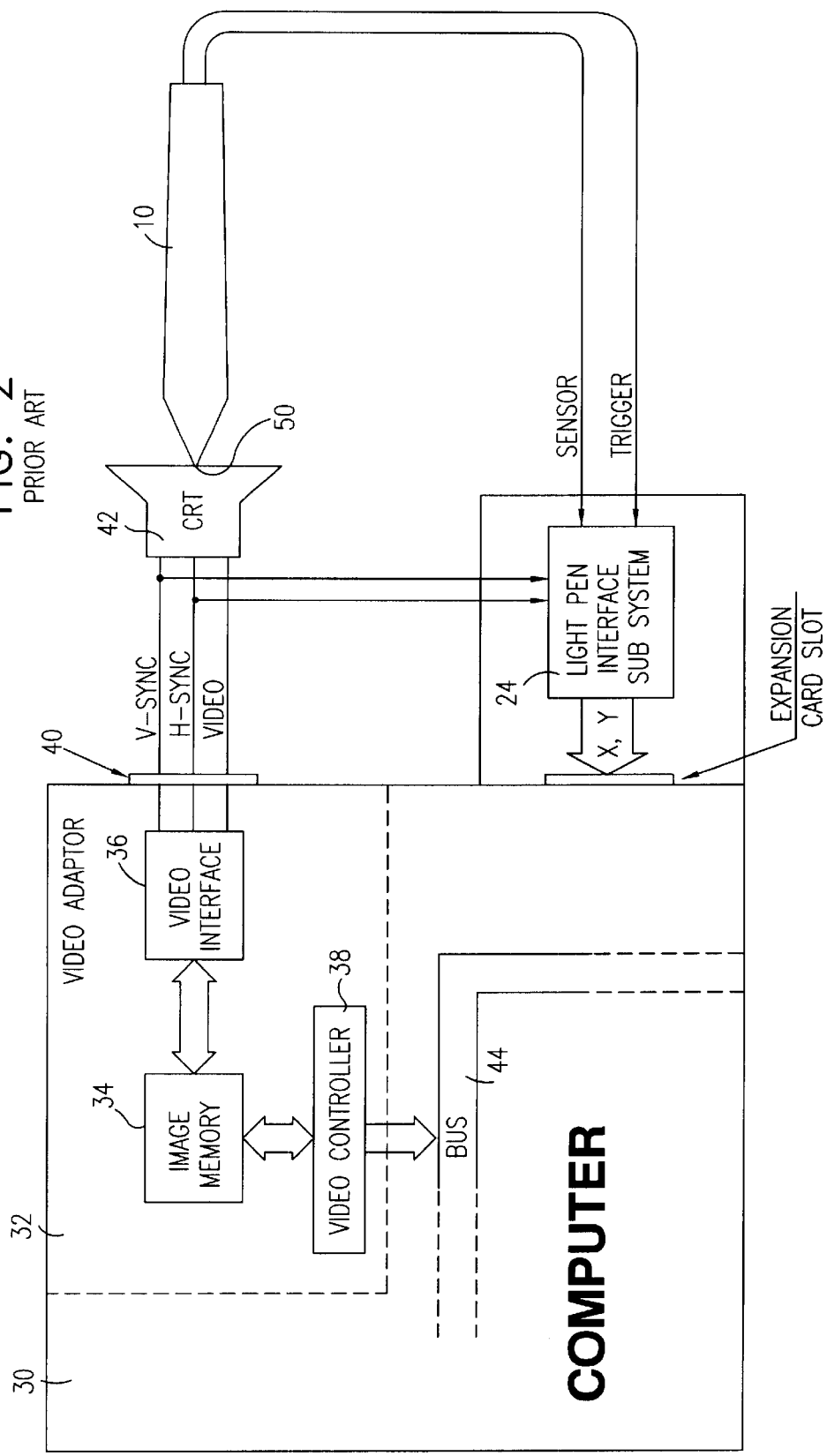
FIG. 2 is a simplified illustration of a prior art interactive computer system employing a typical prior art light pen.

Reference is now made to FIG. 2, which is a simplified illustration of a prior art interactive computer system employing a typical prior art light pen. In the typical prior art system shown in FIG. 2, a typical computer 30 includes a video adapter 32 which contains an image memory 34 coupled to a video interface 36 and to a video controller 38.

The video interface 36 is coupled via a video connector 40 to a CRT display 42 and provides thereto a video signal as well as vertical and horizontal sync signals. The video controller 38 interfaces with a main buss 44 of the computer 30.

The light pen interface sub-system 24 (FIG. 1) is seen mounted in an expansion card slot of computer 30. As noted above, light pen interface subsystem 24 receives horizontal and vertical sync signals which are tapped from the video connection between the computer 30 and the CRT display 42 as well as amplified sensor and trigger outputs from the light pen.

Figure 3:
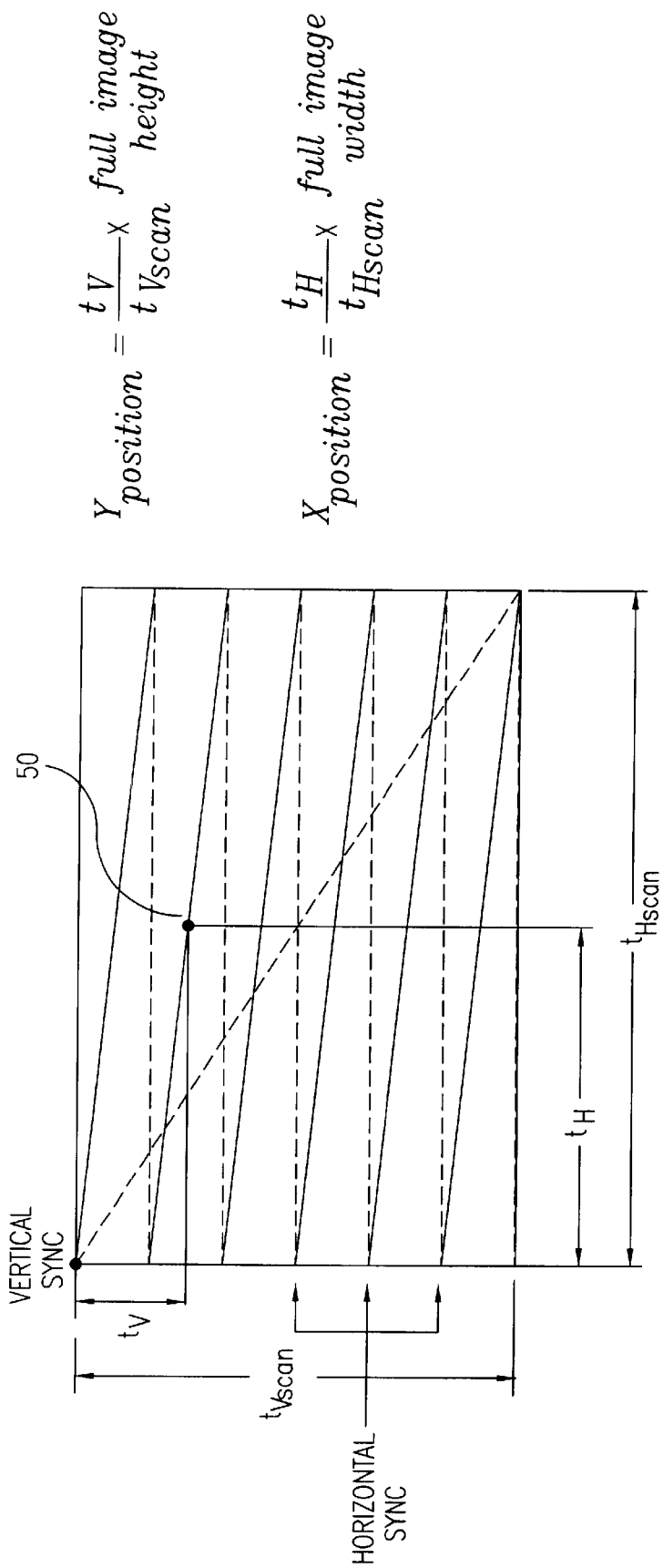
FIG. 3 is a simplified illustration of prior art location determination using a typical prior art light pen such as that shown in FIG. 1 and the system of FIG. 2.

Reference is now made to FIG. 3, which is a simplified illustration of prior art location determination using the typical prior art light pen assembly of FIG. 1 and the typical prior art system of FIG. 2. It can be seen that the position of a point, indicated by reference numeral 50 on the CRT display 42 (FIG. 2) is calculated by using the vertical and horizontal sync signals.

The total vertical scan duration $t_{vscan}$ is determined by measuring the time difference between sequential vertical sync signals. The total horizontal scan duration $t_{hscan}$ is determined by measuring the time difference between sequential horizontal sync signals.

The vertical position is determined by the ratio of the time duration $t_V$ from the vertical sync signal to the instant of detection of light at point 50 by the light pen to the vertical scan duration, multiplied by the full image height.

The horizontal position is determined by the ratio of the time duration $t_H$ from the horizontal sync signal to the instant of detection of light at point 50 by the light pen to the horizontal scan duration, multiplied by the full image width.

Once the horizontal and vertical positions of point 50 have been determined by light pen interface sub system 24, they are communicated directly to the computer via the expansion card slot connectors in computer 30.

Figure 4:
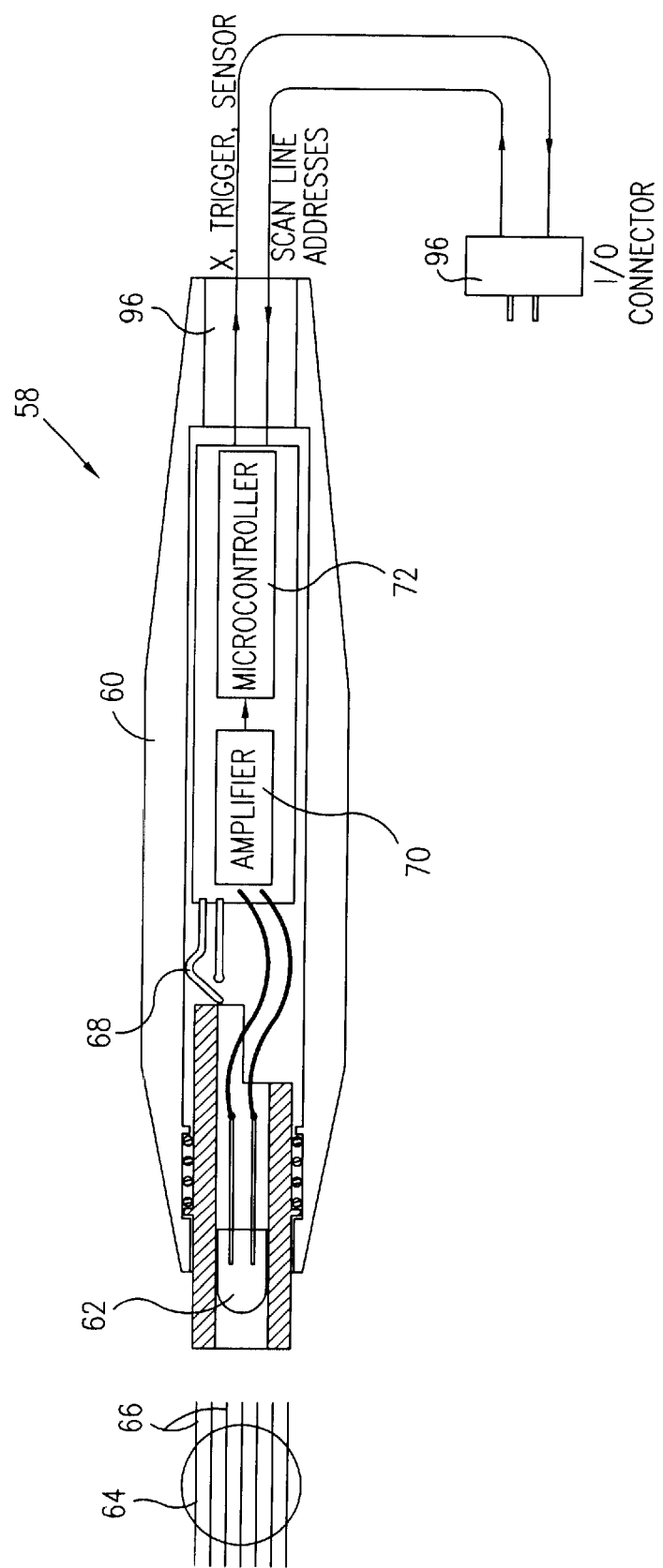
FIG. 4 is a simplified illustration of a light pen assembly constructed and operative in accordance with a preferred embodiment of the present invention.

Reference is now made to FIG. 4, which is a simplified illustration of a light pen assembly 58 constructed and operative in accordance with a preferred embodiment of the present invention. The light pen assembly of FIG. 4 comprises a hand-held housing 60 in which is disposed a light sensor 62, such as a photodiode or phototransistor, which views an area 64 on a CRT screen and typically sees a plurality of scan lines 66 cross that area.

Mounted in housing 60 there is preferably provided a trigger switch 68, such as a pressure-sensitive switch which senses when the pen is pressed against a CRT screen. The output of sensor 62 is supplied to an amplifier 70 which provided an amplified output signal.

In accordance with a preferred embodiment of the present invention, the amplified output signal is supplied to a microcontroller 72 which calculates the horizontal position of a point on the CRT display screen which is viewed by sensor 62. In accordance with a preferred embodiment of the present invention, the microcontroller 72 is located physically within housing 60 of the light pen. Alternatively, it may be located exteriorly of the housing 60 or even inside a computer which drives the CRT display. As a further alternative, the functionality of the microcontroller 72 may be carried out by the computer.

It is a particular feature of the present invention that the microcontroller 72 is operative to determined the position of a point viewed by the light pen without employing the horizontal and vertical sync signals customarily used in the prior art. In clear distinction to the prior art, the present invention employs a scan line address received from the computer in order to determine this position.

It is appreciated that the scan line address is a less precise indication than the horizontal and vertical sync signals and thus it is not an obvious choice as an information source of position determination. The present inventors have determined however, that use of the scan line address, notwithstanding its deficiencies, enables a light pen system to be provided in a significantly simpler manner and at substantially lower cost than that enabled by the prior art.

The present embodiment thus provides a light pen assembly which can be conveniently and inexpensively connected to a standard I/O port on a conventional computer and which obviates the need for tapping the horizontal and vertical sync signal outputs to the display and also obviates the need for installation of a dedicated light pen interface card into an expansion slot of the computer. Thus the light pen of the present invention can be readied for use by most users without requiring dismantling of their computer or professional installation.

Reference is now made additionally to FIG. 5, which is a simplified illustration of an interactive computer system constructed and operative in accordance with the present invention and employing the light pen assembly of the present invention. In the system shown in FIG. 5, a typical computer 80 includes a video adapter 82 which contains an image memory 84 coupled to a video interface 86 and to a video controller 88. The video interface 86 is coupled via a video connector 90 to a CRT display 92 and provides a video signal as well as vertical and horizontal sync signals. The video controller 88 interfaces with a main bus 94 of the computer 80.

In contrast to the prior art no light pen interface subsystem is mounted in an expansion card slot of computer 80. As noted above, there is no light pen interface subsystem which receives horizontal and vertical sync signals which are tapped from the connection the computer 80 and the CRT display 92.

Instead, the microcontroller 72 (FIG. 4) provides a calculated X (horizontal) position output indication via an I/O connector 96, such as a universal serial bus connector, an I/O interface of computer 80 and a conventional I/O controller 98 of computer 80 to main bus 94. The Y (vertical) position is given by the current scan line address at the instant of detection by the sensor.

Reference is now made to FIGS. 6A, 6B, 6C, 6D and 6E, which are timing diagrams illustrating the operation of the interactive computer system of FIG. 5. FIG. 6A illustrates the timing of the entry of the CRT beam into the field of view of the sensor 62 (FIG. 4) and illustrates pulses produced by the sensor 62. The interval between the pulses represents the horizontal scan rate of the CRT. The rising edges of the individual pulses represent the instant at which the sensor 62 first senses the CRT beam and are indicated as $t_{Si+n}$. The total number of pulses produced by the sensor per frame is a function of the size of the field of view of the sensor.

Fig. 6B indicates the timing of scan line addresses received by the light pen 58 (FIG. 4) from the computer 80 via the I/O connector 96 (FIG. 4). FIG. 6C shows the instant of the beginning of each horizontal scan line address, as received by the light pen 58. It is noted that this instant is somewhat offset from the horizontal sync instant due to asynchronous communication and processing delays which include delays due to computer multi-tasking. It may be appreciated from a consideration of FIG. 6C that the instants of the beginning of each horizontal scan line, as received by the light pen 58 are not entirely uniformly spaced in time, for these reasons.

FIG .6D illustrates the raw X position determination for each detection by sensor 62. It is seen that the elapsed time between the start of each scan line instant and each sensor detection instant defines the X position and further that this elapsed time varies in an unpredictable manner from scan line to scan line due to the aforesaid asynchronous communication and processing delays. This variation is corrected for using averaging techniques in order to provide an enhanced accuracy output indication of horizontal position.

FIG. 6E shows the transmission of a horizontal position output signal by the pen in response to each group of detections by sensor 62, corresponding to a CRT field.

Figure 7:
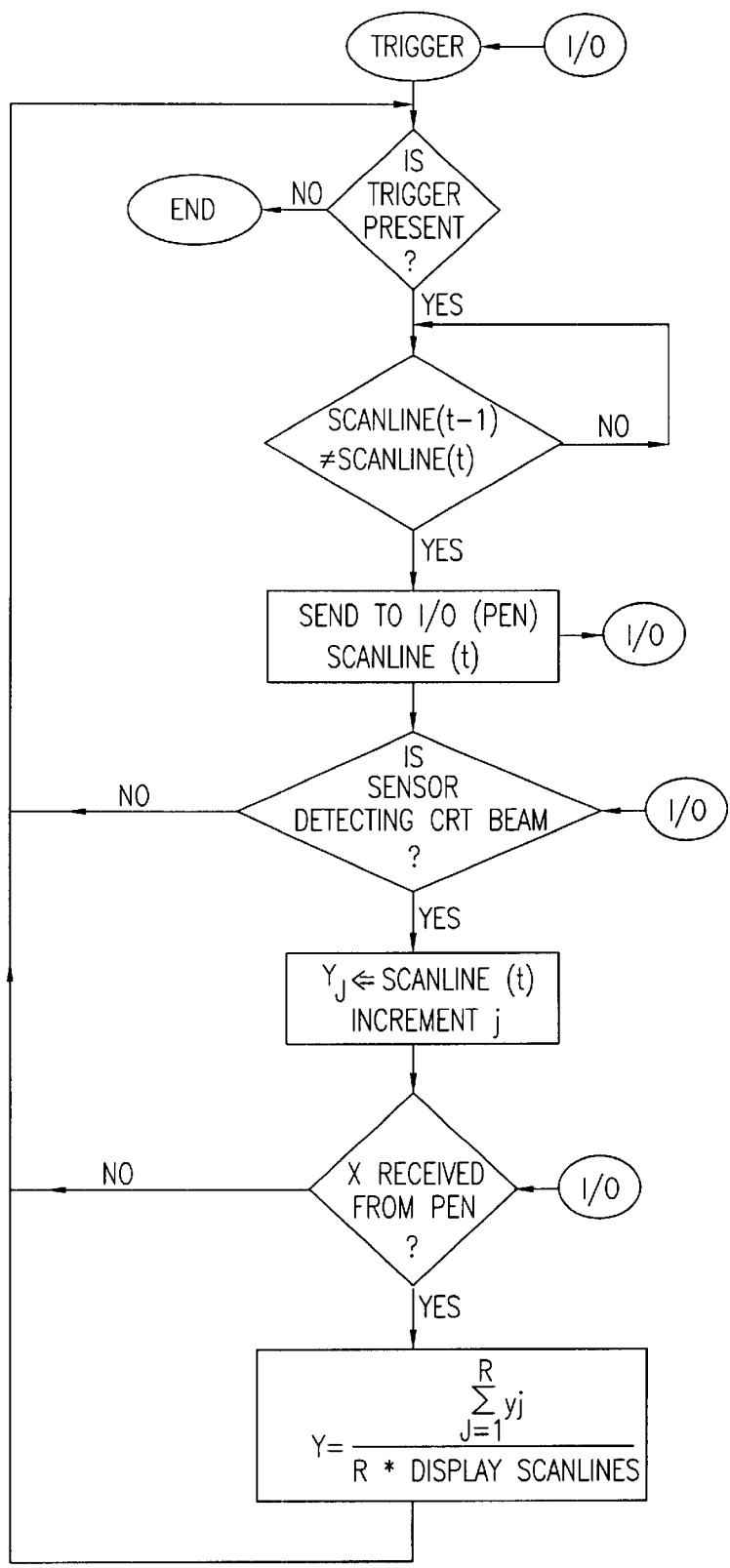
FIG. 7 is a flow chart illustrating operation of the interactive computer system of FIG. 5 in response to a trigger input whereby scan line addresses are output an I/O port.

Reference is now made to FIG. 7, which is a flow chart illustrating typical operation of the interactive computer system of FIG. 5 in response to a trigger input whereby scan line addresses are output via an I/O port. Upon receipt of a trigger signal from the light pen 58 (FIG. 4) via I/O connector 96 (FIG. 4), an inquiry is made of the video card in the computer 80 whether the scanline address has changed. If yes, the new scanline address is transmitted to pen 58 by computer 80 via I/O connector 96. If sensor 62 is detecting a CRT beam at that instant, the scanline address is stored in a register in computer 80. When an horizontal position output is received by the computer 80 from the light pen, the vertical position is calculated by the indicated equation, where R is a running index of horizontal scan lines detected by sensor 62 and DISPLAY SCANLINES refer to all of the scan lines on the CRT and not just those detected by the light pen sensor 62.

Figure 8:
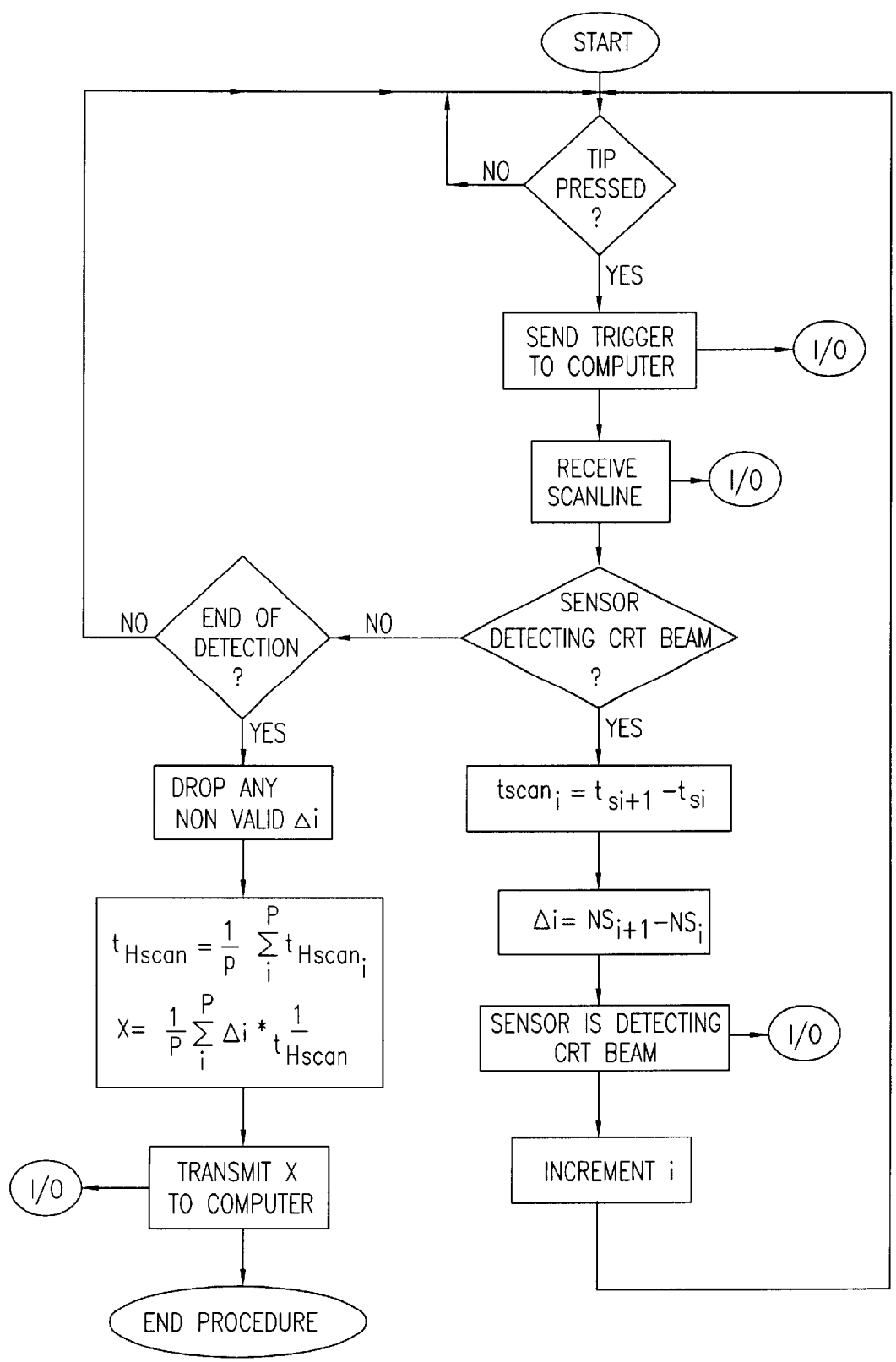
FIG. 8 is a flow chart illustrating operation of the interactive computer system of FIG. 5 in response to a trigger input whereby an estimated X position is derived from scan line addresses output via the I/O port and from light inputs to the light pen.

Reference is now made to FIG. 8, which is a flow chart illustrating operation of the interactive computer system of FIG. 5 in response to a trigger input whereby an estimated X position is derived from scan line addresses output via the I/O port and from light inputs to the light pen. When the tip of the light pen 58 (FIG. 4) is pressed onto the screen of a CRT display, thus operating trigger switch 68 (FIG. 4), the resulting trigger signal is supplied to computer 80 via I/O connector 96.

The computer 80 then receives the scanline address. In accordance with one preferred embodiment of the present invention, the scanline address may be derived from a DirectDraw scanline function provided in DirectX software, which is commercially available from Microsoft.

If sensor 62 detects a CRT beam, the time difference between sensor outputs, shown in FIG. 6A, is determined and the raw horizontal position, shown in FIG. 6D, is determined. An indication is provided by the light pen 58 to the computer 80 via I/O connector 96 that the sensor 62 is detecting a CRT beam. The computer then increments to the next scan line.

Once the sensor 62 no longer detects a CRT beam, the received raw horizontal position indications are evaluated and clearly erroneous indications are dropped. A summing and averaging functionality is then applied to provide an horizontal position output, shown in FIG. 6E. Here P indicates the number of not clearly erroneous raw horizontal position indicators. The horizontal position output is transmitted via I/O connector 96 to computer 80.

Figure 9:
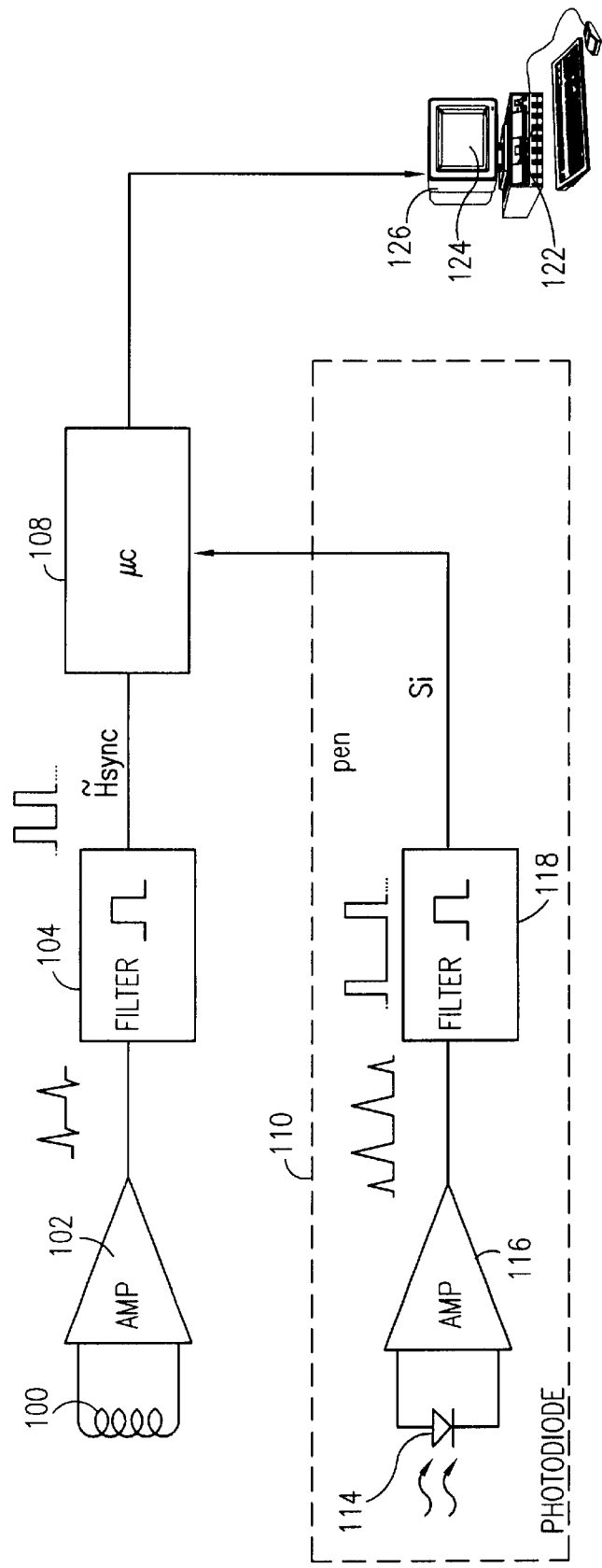
FIG. 9 is a simplified block diagram of a second preferred embodiment of the present invention.
Figure 10:
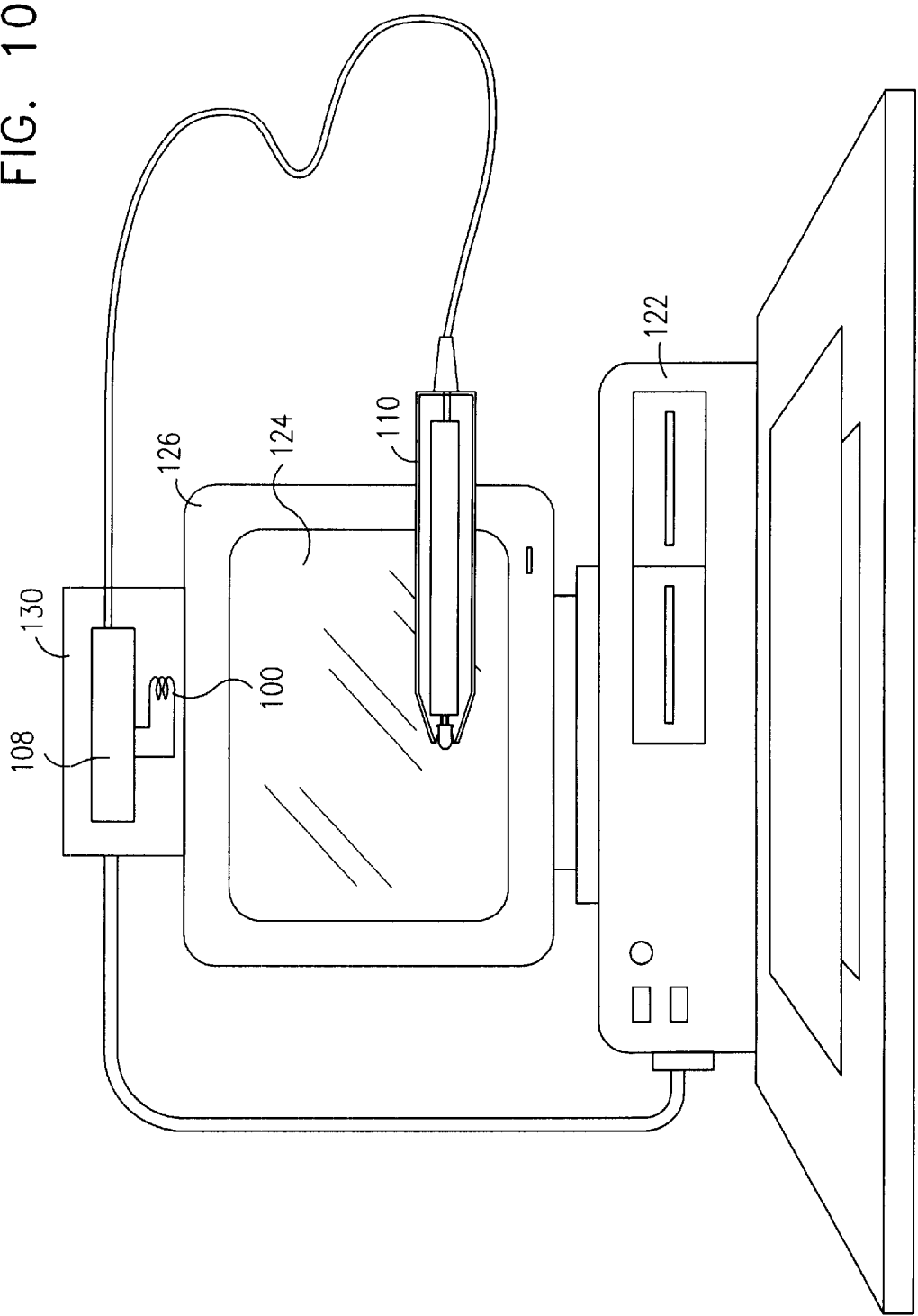
FIG. 10 shows a device according to a first variation of FIG. 9 in use with a PC.
Figure 11:
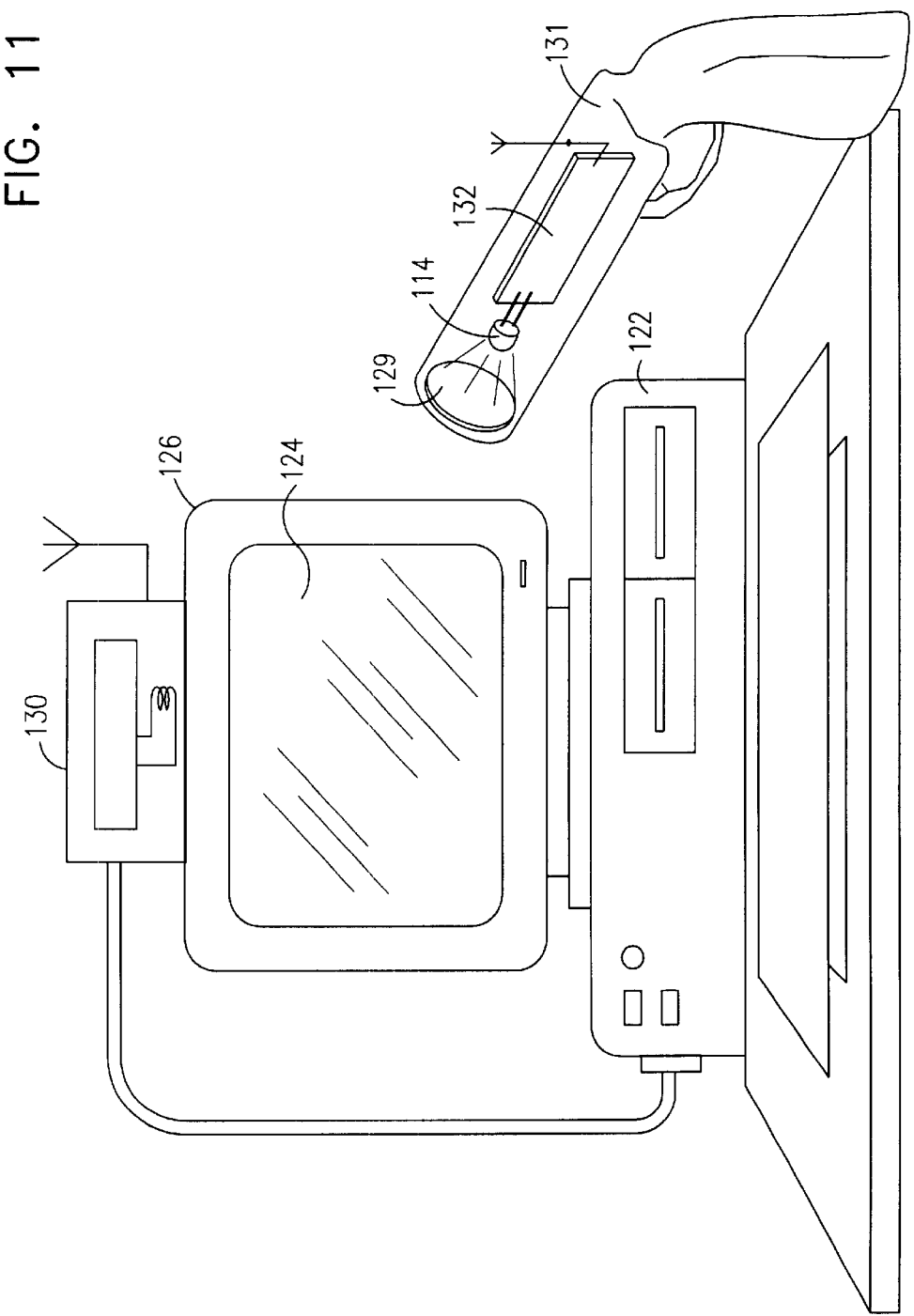
FIG. 11 shows a device according to a second variation of the embodiment of FIG. 9 in use with a PC.

Reference is now made to FIG. 9, which is a simplified block diagram of a light pen 110 according to a second embodiment of the present invention. In this embodiment the horizontal synchronization signals is obtained by utilizing an inductive coil 100, placed in proximity to a CRT tube 126, to detect the sync signals via inductive pickup of electrostatic noise from the CRT tube 126.

In the embodiment of FIG. 9 the inductive coil 100 is placed in proximity to the CRT tube 126. The electromagnetic noise is picked up by the coil 100 and amplified by an amplifier 102. The amplifier 102 is followed by ban pass filter 104 tuned to the frequency of the horizontal synchronization signal, and which is operative to isolate said signal. In typical systems today the horizontal sync signal is generally in the range of 30–100 KHz.

The isolated horizontal synchronization signal is fed to a microcontroller 108, which also receives a signal from the light pen 110, which is located facing the screen of the CRT 126. The microcontroller 108 functions as a correlator for correlating the isolated signals with the signals from a photodiode 114 of the light pen 110. The time delay, between the sync signals and the signals from the photodiode, indicates the relative position of the light pen 110 on the screen as will be explained hereinbelow.

In the embodiment shown in FIG. 9 the light pen 110 is connected to the microcontroller 108 via a wireless link, typically an infra-red or r.f. link, and receives the signal via a wireless receiver 112.

It will be appreciated by the skilled person that the inductive coil can be placed anywhere in the electromagnetic field of the CRT, and in addition can be placed in the vicinity of input wires connecting thereto.

The light pen 110 may be as described in previous embodiments. A tip of light pen 110 comprises the photodiode 114 which detects a passing scan line of the screen 124. The output of the photodiode 114 is amplified by an amplifier 116 and conditioned by a waveshaper 188, before being transmitted via a transmitter 120 to the microcontroller 108.

The microcontroller 108 counts the interval between the horizontal sync signal and the instant when light from the scan line reaches the pen. The intervals thus detected are a certain proportion of the intervals between successive horizontal sync signals As will be explained hereinbelow, these proportions are indicative of the relative position of the light pen 110 on the screen. Thus it is possible to deduce accurately the position of the pen on the screen 124 and it is possible to use the light pen, for example, to generate thin and accurate lines.

The microcontroller 108 preferably calculates the co-ordinates of the light pen 110 and passes these to a computer 122.

The vertical sync signal is estimated as in the embodiment of FIG. 1–8. Since the vertical sync signal only appears once per frame, it is much esier to estimate its timing, and inaccuracies are far less important because the actual scanning is done horizontally. Thus there is a relatively large delay between vertical pixel progression.

Figure 12:
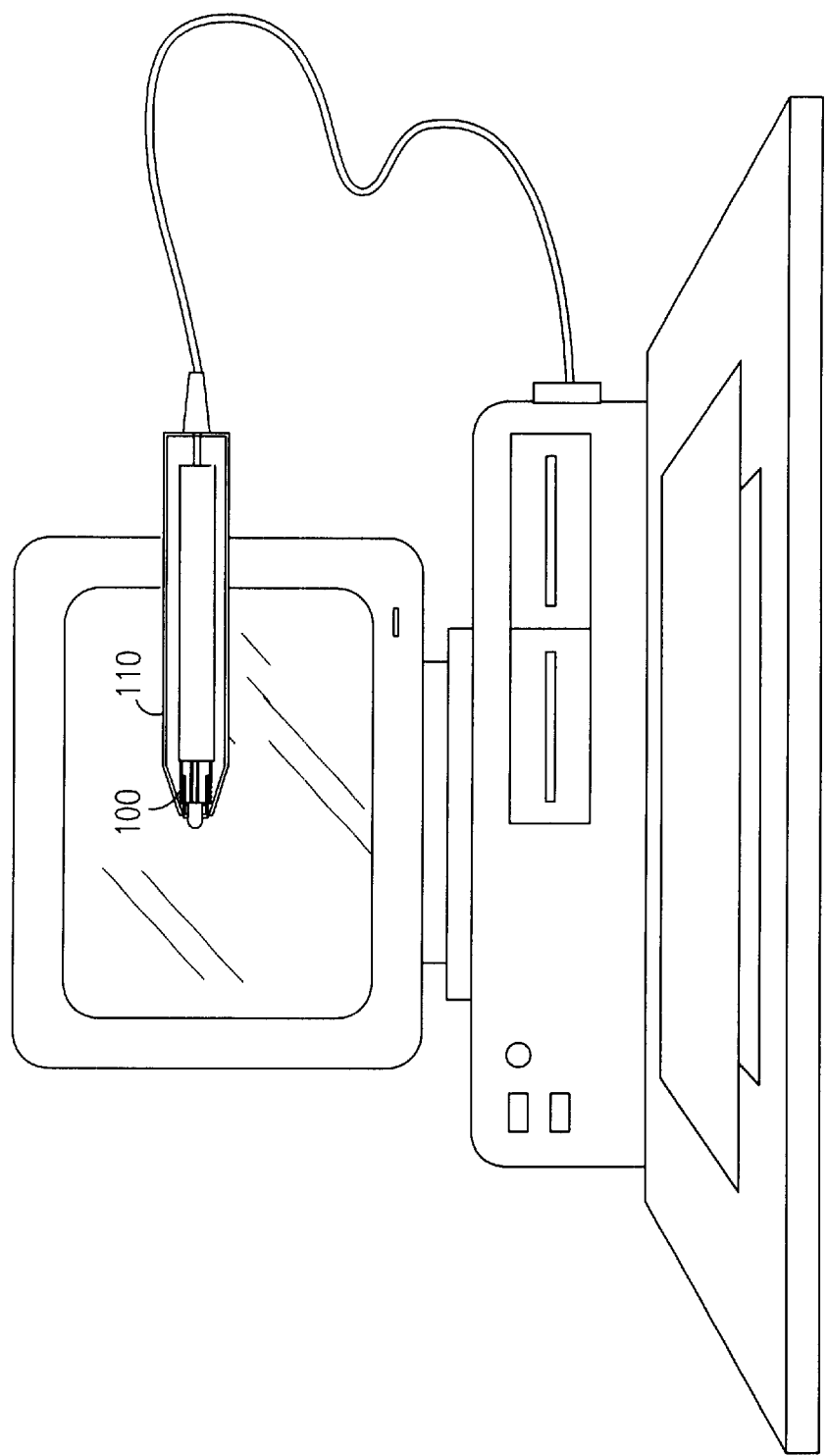
FIG. 12 shows a device according to a third variation of the embodiment of FIG. 9 in use with a PC.

Reference is now made to FIG. 12, which shows a light pen 110 connected to the microcontroller 108 by wire. The microcontroller is in a box 130 which is placed on the CRT 126 such that the coil 100 is within the electric field of the CRT 126.

Reference is now made to FIG. 13, which shows a variation of a light pen according to the embodiment of FIG. 9, which variation allows of detection of the positioning of the pen at a distance from the screen. In this case the light pen is in the form of a gun 131, and, since it is at a distance from the screen, it is able to detect more than none scan line because it has a given arc of view. The number of scan lines it detects is used by the microcontroller as an indication of its distance from the screen. The photodiode 114 is preferably placed behind a lens 129. The lens 129 focuses the light of the screen onto the photodiode 114.

Figure 14A:
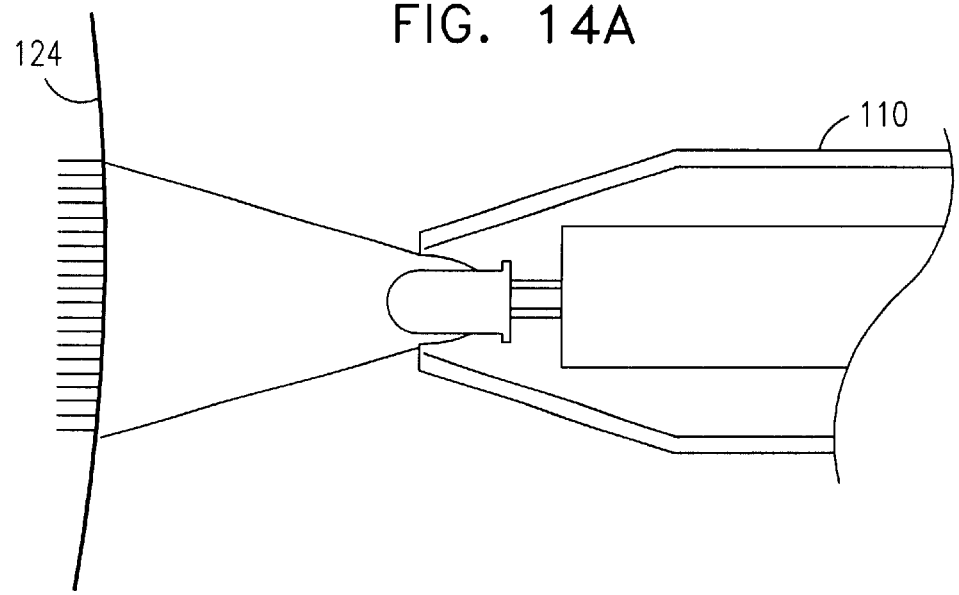
FIGS. 14A and 14B show, in exemplary fashion, how the embodiment of FIG. 9 can be used to estimate the distance of the light pen from the screen.
Figure 14B:
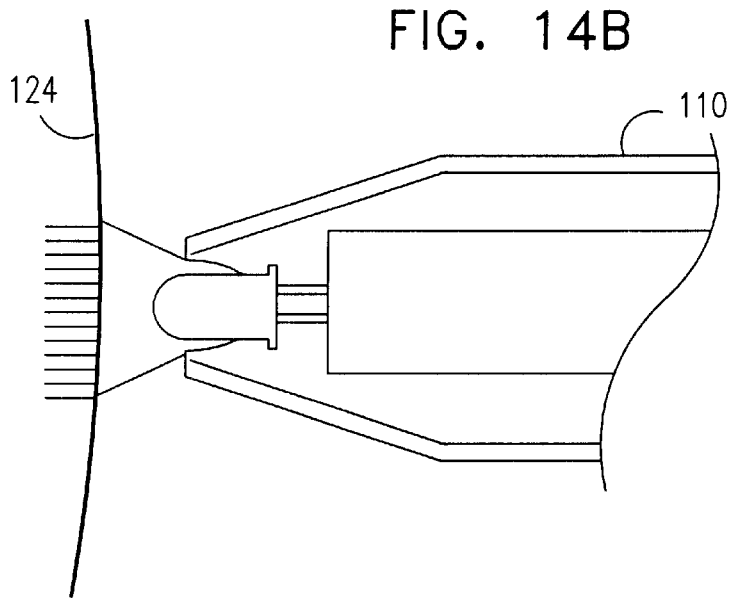

Reference is now made to FIG. 14, which shows another preferred embodiment of the present invention. In FIG. 14 the inductive coil 100 is incorporated witching the light pen 110. Thus the box 130 placed on top of the CRT is dispensed with.

Reference is now made to FIG. 15, wherein is shown a variation of the embodiment of FIG. 12. In FIG. 15, the connection between the light pen and the box 130 is a wireless connection.

Figure 16A:
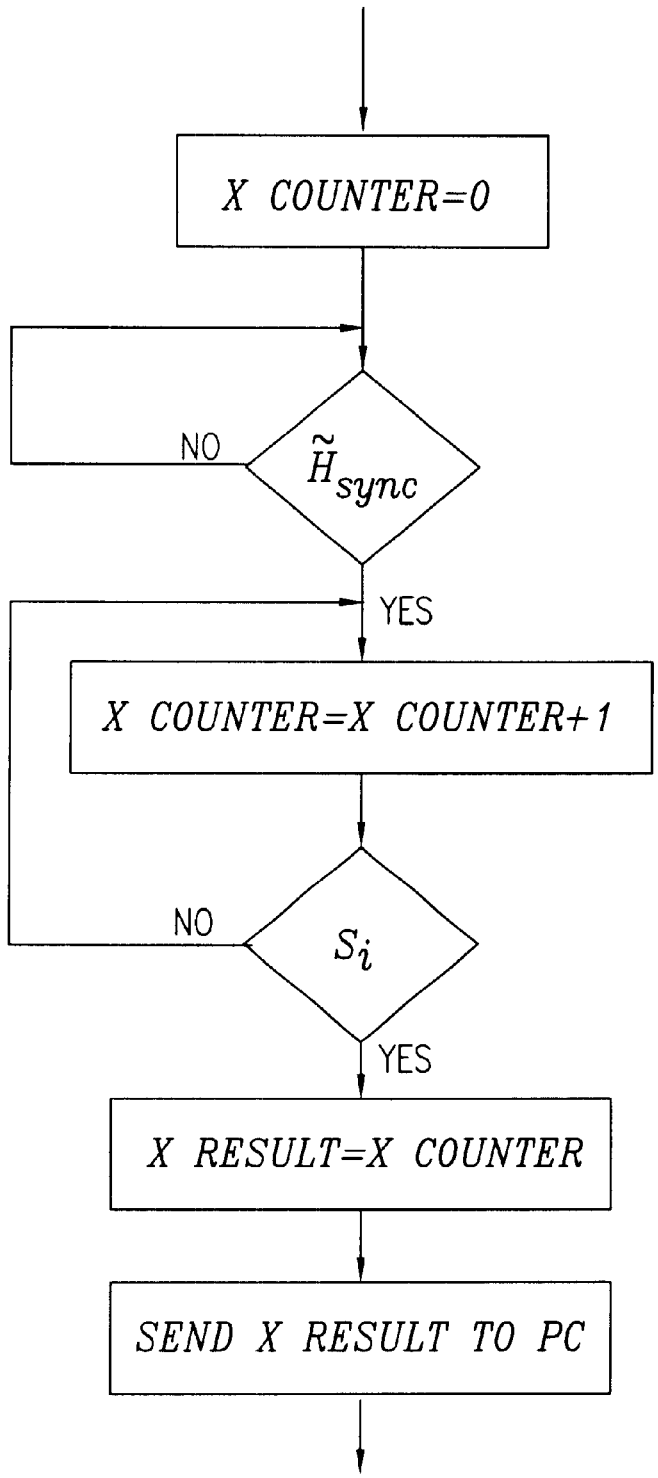
FIGS. 16A and 16B are flow charts illustrating the process of determining the position of the light pen relative to the screen according to the embodiment of FIG. 9.
Figure 16B:
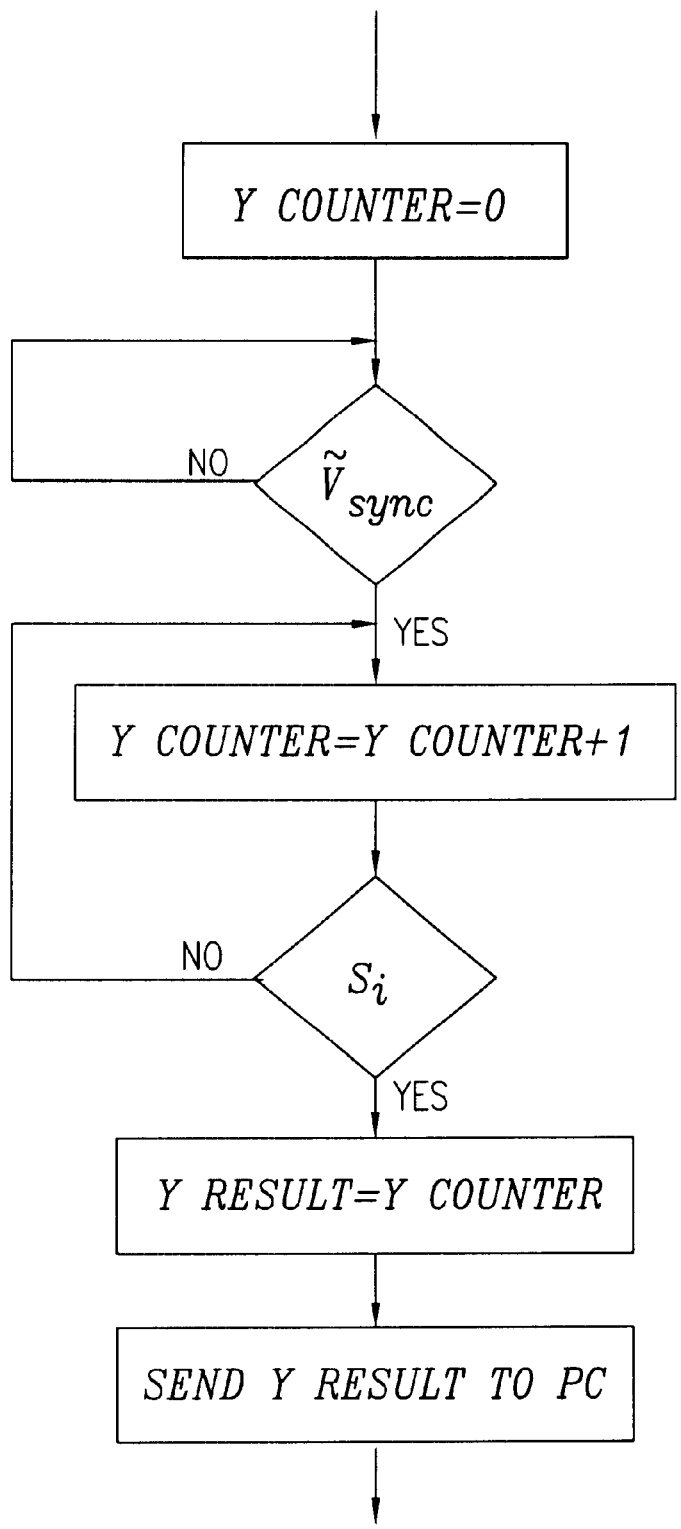

Reference is now made to FIGS. 16A and 16B. FIGS. 16A and 16B are simplified illustrations showing how the number of scan lines visable to the light pen can be used to estimate the relative distance of the light pen 110 from the screen 124. The tip detects light within a cone, and the further away the pen is from the screen the larger is the number of scan lines that fall within the cone. The operation described with respect to FIGS. 16A and 16B is applicable to all of the embodiments and variations described herein.

Reference is now made to FIG. 17, which is a diagrammatic illustration showing how the horizontal synchronization pulses Hsync and the corresponding scan signals Si are translated directly into relative distances of the light pen across the screen.

Reference is now made to FIGS. 18A and 18B, which are flow diagrams showing operation of the embodiment of FIG. 9. In FIGS. 18A and 18B the horizontal synchronization signals is received and a timer is started. The light detection signal is then received from the light pen assembly and the timer is stopped. The time reaches as the timer is stopped is either sent directly to the PC or a co-ordinate is calculated by microcontroller 108/. The signal sent to the PC indicates the relative position of the light pen with respect to the screen.

Reference is now made to FIG. 19, which is a simplified illustration of an embodiment of the present invention particularly useful as part of an interactive toy. In the embodiment of FIG. 19, there is shown an electromagnetic radiation pick up device 150, which is operative to receive electromagnetic noise in a wireless manner from a raster display 152. A filter, such as filter 104 (FIG. 9) or filter 106 (FIG. 9) receives an output from the electromagnetic radiation pick up device for producing at least one reconstructed raster synchronization signal from the electromagnetic noise. The correlator, included within microprocessor 108, correlates an information signal with the at least one reconstructed raster synchronization signal.

In accordance with a preferred embodiment of the present invention, the information signal is provided by an information signal generator 160, which preferably comprises at least two and preferably three light receivers 162, which receive light from a region on the raster display. Preferably, each of the light receivers 162 receives light from a different region on the display. The information signal generator 160 produces an information signal which is employed by the correlator, for providing information regarding the orientations of the light receivers relative to the display.

It is appreciated that the embodiment of FIG. 19 is not limited to use with a wireless noise pickup and may operate with a conventional synchronization signal input instead. The embodiment of FIG. 19 may be employed in combination with any suitable one or more of the features described hereinabove with reference to FIGS. 1–18.

It will be appreciated by persons skilled in the art that the present invention is not limited by what has been particularly shown and described hereinabove. Rather the scope of the present invention includes combinations and subcombinations of the various features described as well as modifications thereof which would occur to a person of skill in the art upon reading the foregoing description and which are not in the prior art.

What is claimed is:

1. A device for use with a raster display having associated therewith electromagnetic notice which includes signals related to at least one raster synchronization signal, said device including:

an electromagnetic radiation pick up device operative to receive said electromagnetic noise in a wireless manner;

a filter receiving an output from said electromagnetic radiation pick up device for producing a reconstructed horizontal raster synchronization signal from said electromagnetic noise; and a correlator correlating an information signal with said horizontal raster synchronization signal received via said filter and said pick up device and with an estimated vertical synchronization signal.

2. A device according to claim 1 and wherein said electromagnetic radiation pick up device is operative to pick up electromagnetic noise generated at said raster display.

3. A device according to claim 1 and wherein said electromagnetic radiation pick up device is operative to pick up electromagnetic noise generated by an input to said raster display.

4. A device according to claim 1 and wherein said electromagnetic radiation pick up device is operative to pick up electromagnetic noise generated at a display signal generator generating an input signal to said raster display.

5. A device according to claim 1 and also comprising an information signal generator operative to generate said information signal.

6. A device according to claim 5 and wherein said information signal generator comprises a light receiver which receives light from a region on said raster display and produces said information signal responsive thereto.

7. A device according to claim 6 and wherein said light receiver produces an information signal indicative of said position thereof relative to said display in three dimensions.

8. A device according to claim 5 and wherein said information signal generator comprises at least two light receivers, each of which receives light from a different region on said display, and produces an information signal responsive thereto, said information signal being employed by said correlator for providing information regarding said orientations of said at least two light receivers relative to said display.

9. A device according to claim 5 and wherein said information signal generator comprises at least three light receivers, each of which receives light from a different region on said display, and produces an information signal responsive thereto, said information signal being employed by said correlator for providing information regarding said orientations of said at least three light receivers relative to said display.

10. A device for use with a raster display having associated therewith electromagnetic noise which includes signals related to at least one synchronization signal, said device including:

an electromagnetic radiant pick up device operative to receive said electromagnetic noise in a wireless manner;

a filter receiving an output from said electromagnetic radiation pick up device for producing a reconstructed horizontal synchronization signal from said electromagnetic noise; and a correlator correlating an information signal with said horizontal synchronization signal received via said filter and said pick up device and with an estimated vertical synchronization signal.

11. A device according to claim 10 and wherein said electromagnetic radiation pick up device is operative to pick up electronic noise generated at said display.

12. A device according to claim 10 and wherein said electromagnetic radiation pick up device is operative to pick up electromagnetic noise generated by an input to said display.

13. A device according to claim 10 and wherein said electromagnetic radiation pick up device is operative to pick up electromagnetic noise generated at a display signal generator generating an input signal to said display.

14. A device according to claim 10 and also comprising an information signal generator operative to generate said information signal.

15. A device according to claim 14 and wherein said information signal generator comprises a light receiver which receives light from a region on said display and produces an information signal responsive thereto.

16. A device according to claim 15 and wherein said light receiver produces an information signal indicative of said position thereof relative to said display in three dimensions.

17. A device according to claim 14 and wherein said information signal generator comprises at least two receivers, each of which receives light from a different region on said display, and produces an information signal responsive thereto, said information signal being employed by said correlator for providing information regarding said orientations of said at least two light receivers relative to said display.

18. A device according to claim 14 and wherein said information signal generator comprises at least three light receivers, each of which receives light from a different region on said display, and produces an information signal responsive thereto, said information signal being employed by said correlator for providing information regarding said orientations of said at least three light receivers relative to said display.

19. A device for use with a raster display, said device comprising:

a light receiver operative to receive light within a given arc of view from a region on a raster display, said light receiver being operative to detect more than one scan line of a raster display and to produce a signal as a function of the number of scan lines viewed within the arc of view;

a processor which processes said signal so as to determine a distance of said light receiver from a raster display;

an electromagnetic radiation pick up device operative to receive electromagnetic noise assoicated with a raster display in a wireless manner;

a filter receiving an output from said electromagnetic radiation pick up device for producing a reconstructed horizontal synchronization signal from said electromagnetic noise; and a correlator correlating an information signal with said horizontal synchronization signal received via said filter and said pick up device and with an estimated vertical synchronization signal.

* * * * *